United States Patent [19]

Chung et al.

[11] Patent Number: 5,450,528
[45] Date of Patent: Sep. 12, 1995

[54] SELF-LEARNING NEURAL MULTI-LAYER NETWORK AND LEARNING METHOD THEREOF

[75] Inventors: Ho-sun Chung, Taegu; Kyung-hun Lee, Kyungsangbuk-do, both of Rep. of Korea

[73] Assignee: Gold Star Electron Co., Ltd., Chungcheongbuk-do, Rep. of Korea

[21] Appl. No.: 375,251

[22] Filed: Jan. 19, 1995

Related U.S. Application Data

[63] Continuation of Ser. No. 112,019, Aug. 26, 1993, abandoned.

[30] Foreign Application Priority Data

Aug. 27, 1992 [KR] Rep. of Korea .................... 92-15485

[51] Int. Cl.⁶ ............................................. G06F 15/18
[52] U.S. Cl. ....................................... 395/27; 395/23; 395/24
[58] Field of Search ............................. 395/23, 27, 24

[56] References Cited

U.S. PATENT DOCUMENTS

| | | | |
|---|---|---|---|
| 4,912,647 | 3/1990 | Wood | 395/23 |
| 5,003,490 | 3/1991 | Casteloz et al. | 395/21 |
| 5,095,443 | 3/1992 | Watanabe | 395/23 |

OTHER PUBLICATIONS

A Self Learning Neural Network LSI Using Neuron MOSFET's Shibata et al. IEEE/2-4 Jun. 1992.
A 336-Neuron, 28K-Synapse, Self-Learning Neural Network Chip with Branch-Neuron-Unit Architecture Arima et al., IEEE Nov. 1991.
A Self-Learning NN Composed of 11J2 Digital Neurons in Wafer Scale LSI's Yasunaga et al., IEEE/18-21 Nov. 1991.
D. Park, "Performance Evaluation of Back-Propagation Networks Using Simulated Pattern Generating Processes", Chonbuk National University, Korea.

*Primary Examiner*—Allen R. MacDonald
*Assistant Examiner*—Richemond Dorvil
*Attorney, Agent, or Firm*—Rothwell, Figg, Ernst & Kurz

[57] ABSTRACT

A self-learning multi layer neural network and the learning method thereof are characterized in that N-bit input data and M-bit desired output data are received, a weight value of each synapse is adjusted so as to produce output data corresponding to the input data, and self-learning is performed while proceeding to a next layer. Thus, it is not necessary for the user to input and adjust all the weight values of the respective synapse while the network performs self-learning and a desired function.

4 Claims, 3 Drawing Sheets

SELF-LEARNING NEURAL MULTI-LAYER NETWORK AND LEARNING METHOD THEREOF

This is a continuation of application Ser. No. 08/112,019, filed Aug. 26, 1991 now abandoned.

BACKGROUND OF THE INVENTION

The present invention relates to a multi-layer neural network, and more particularly to a self-learning multi-layer neural network and the learning method.

The learning multi-layer neural network performs desired functions in such a manner that a user stores the weight values of the respective synapse in an external memory to perform a learning. In other words, the user stores different weight values in the memory according to input and output functions to be used to let the respective synapse have the corresponding different weight values, thereby performing desired functions. Thus, it was inconvenient that the user stored the weight values possessed by the synapse of the multi-layer neural network in the memory so as to perform the desired functions.

SUMMARY OF THE INVENTION

Therefore, to solve the above problem, it is an object of the present invention to provide a self-learning multi-layer neural network in which a user does not need to input learned weight values.

It is another object of the present invention to provide a learning method in a self-learning multi-layer neural network.

To accomplish the above object of the present invention, there is provided a self-learning multi-layer neural network characterized in that N-bit input data and M-bit desired output data are received, a weight value of each synapse is adjusted so as to produce output data corresponding to the input data, and self-learning is performed while proceeding to a next layer.

To accomplish the other object of the present invention, there is provided a learning method in a self-learning multi-layer neural network comprising the steps of:
(a) initializing a weight value of each synapse;
(b) receiving input data and desired output data corresponding to the input data;
(c) performing a learning by receiving the input data;
(d) comparing output data which results from the learning of the multi-layer neural network with the desired output data, thereby generating an error value if not matched and adjusting a weight value of each synapse, and completing the learning if matched; and
(e) proceeding to a next layer to repeat the steps (b) through (d) when a desired result is not obtained even though the learning is repetitively performed a predetermined number of times.

DETAILED DESCRIPTION OF THE PREFERRED EMBODIMENT

A learning algorithm will first be described below, prior to explaining a self-learning multi-layer neural network of the present invention with reference to the accompanying drawings.

The learning algorithm of the present invention should meets the following conditions.

A modified perceptron rule is used in the learning of the neural network. In this rule, a weight value is not successively varied and a learning constant is one.

An activation function is embodied by a buffer, which is a nonlinear monopolar hard limiter of which an output is one if net is equal to or greater than zero, while the output is zero if net is less than zero. In the learning algorithm of the present invention, the activation function should be close to an ideal hard limiter.

The algorithm of the present invention comprises the following steps.
1. A weight value of each synapse is initialized as zero. The number of patterns and repetition times are set.
2. Input data and desired output data corresponding to the input data are input, and an output is calculated as follows:

$$OUTPUT = \text{sgn}(W, Y)$$

where W represents a weight value, and Y represents an input data.

3. The output data which has been calculated in step 2 is compared with a desired output data, to generate an error value as follows:

$$ERROR = d - o$$

where d represents a desired output data, and o represents the calculated output data.

4. If an error is generated, the weight value is corrected as follows:

$$W(t+1) = W(t) + Y(d-0)$$

where W represents a weight function, and t represents a time variable. If the input is one, the weight value increases or decreases by one. If the input is not one, the weight value is not corrected. The corrected values of the weight values are temporarily stored during the calculation of all the input patterns and then entirely corrected.

5. Steps 2 through 4 are repeated with respect to all the inputs until the learning is succeeded. If the learning is not succeeded in a first layer, step 6 is proceeded.

6. The layer increases to perform steps 2 through 5.

The circuit according to the present invention using the above algorithm will be described as follows.

Figure 1:
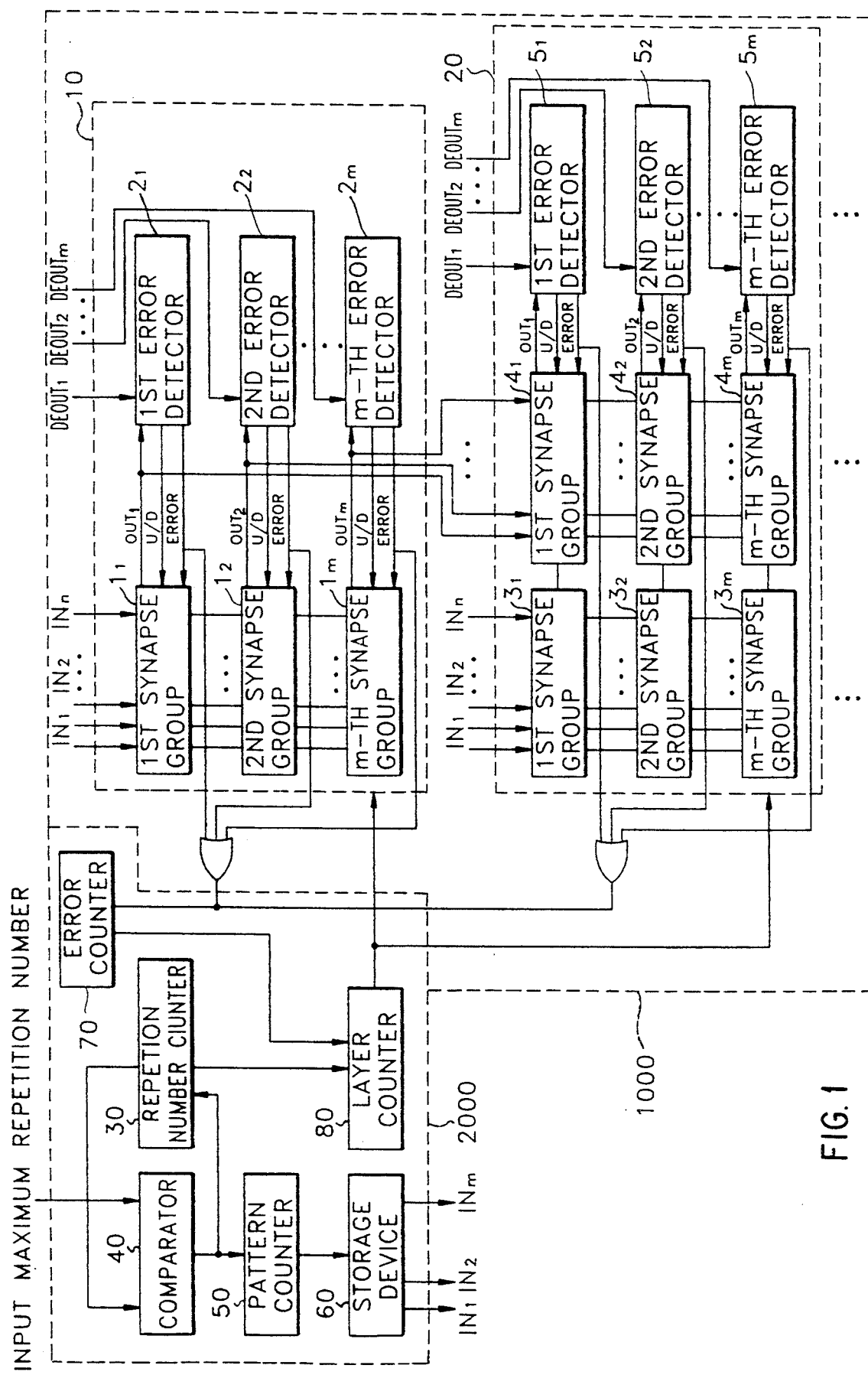
FIG. 1 is a block diagram of a self-learning multi-layer neural network according to the present invention.

FIG. 1 is a block diagram of a self-learning multi-layer neural network according to the present invention.

In FIG. 1, a first-layer neural network 10 comprises first through m-th synapse groups $1_1, 1_2, \ldots, 1_m$ which receives input signals $IN_1, IN_2, \ldots, IN_n$ and performs a learning according to the input signals $IN_1, IN_2, \ldots, IN_n$, so as to produce output signals $OUT_1, OUT_2, \ldots, OUT_m$, and first through m-th error detectors $2_1, 2_2, \ldots, 2_m$ which receives the output signals $OUT_1, OUT_2,$ ..., $OUT_m$ of first through m-th synapse group $1_1, 1_2, ..., 1_m$ and desired output signals $DEOUT_1, DEOUT_2, ..., DEOUT_m$ to detect errors, and then generates signals for increasing or decreasing weight values in response to the detected error signals. A second-layer neural network 20 comprises first through m-th synapse groups $3_1, 3_2, ..., 3_m$ which receives the input signals $IN_1, IN_2, ..., IN_n$, (m+1)-th through (2m)-th synapse groups $4_1, 4_2, ..., 4_m$ which are connected in series to the first through m-th synapse groups $3_1, 3_2, ..., 3_m$ and which receives the output signals $OUT_1, OUT_2, ..., OUT_m$ of the first through m-th synapse groups $1_1, 1_2, ..., 1_m$, and first through m-th error detectors $5_1, 5_2, ..., 5_m$ which receives the output signals $OUT_1, OUT_2, ..., OUT_m$ of (m+1)-th through (2m)-th synapse groups $4_1, 4_2, ..., 4_m$ and desired output signals $DEOUT_1, DEOUT_2, ..., DEOUT_m$ to detect errors, and then generates signals for increasing or decreasing weight values in response to the detected error signals.

Also, referring to FIG. 1, a predetermined number of layers each of which has the same structure as that of second-layer neural network 20 forms a multi-layer neural network 1000, together with first-layer and second-layer neural networks 10 and 20.

Also, referring to FIG. 1, a controller 2000 for controlling multi-layer neural network 100 comprises a repetition number counter 30 for repetitively learning patterns which are input to multi-layer neural network 100, by a predetermined number of time, a comparator 40 which compares the repetition number of repetition number counter 30 with an input maximum repetition number and then resets repetition number counter 30 for performing a learning in a next layer when a repetitive learning is performed by the input maximum repetition number, a pattern counter 50 for counting n pattern elements constituting a pattern when the output signal of comparator 40 represents that the learning is not performed by the input maximum repetition number, storage means 60 for supplying the input patterns to the multi-layer neural network 100 in response to the output signals of pattern counter 50, an error counter 70 for counting how many error are generated in the result of learning of the n pattern elements in multi-layer neural network 100, and completing the learning when the error is not generated, and a layer counter 80 which receives the output signal of repetition number counter 30 and the output signal of error counter 70 and increases a layer for continuing the learning when the error is generated even though the learning is performed by the input maximum repetition number.

In the FIG. 1 constitution, the counters can be constituted as a predetermined number of flip-flops, the storage means as a memory device, and the comparator as a predetermined number of exclusive-OR gates. Also, the FIG. 1 constitution can be embodied into a single chip, thereby enabling a learning in a single chip.

The self learning multi-layer neural network can, for example, perform an operation of an exclusive-OR gate. In this case, if four 2-bit input patterns and four 1-bit output patterns, and a repetition number are given by the user, the self-learning multi-layer neural network performs a self-learning itself to thereby constitute a neural network for performing an exclusive-OR operation.

Figure 2:
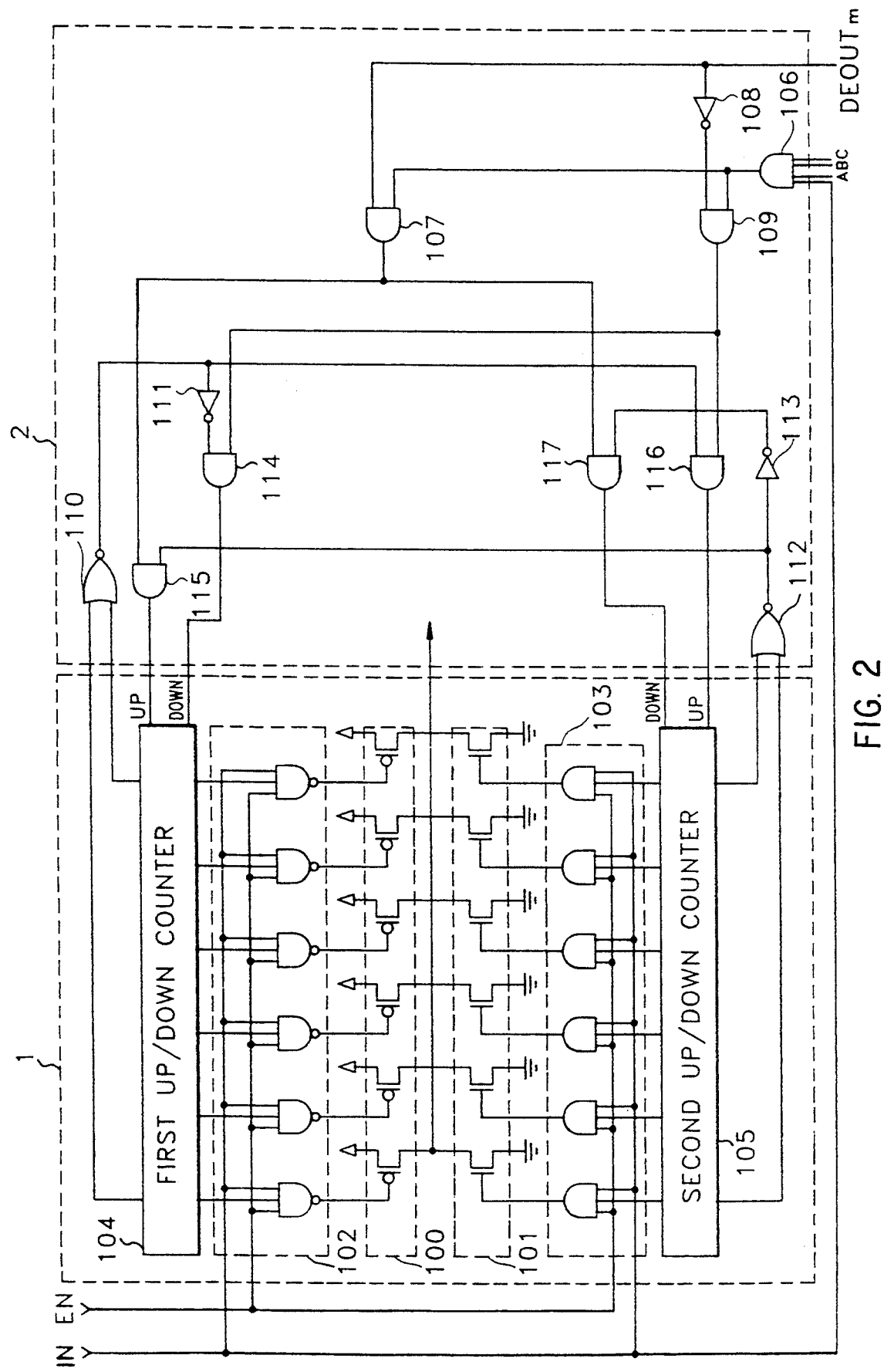
FIG. 2 is a detailed circuit diagram of one embodiment of a group of synapse and an error detector shown in FIG. 1.

FIG. 2 is a detailed circuit diagram of one embodiment of a group of synapse and an error detector shown in FIG. 1.

In FIG. 2, a group of synapse 1 comprises synapse PMOS transistors 100 having respective different weight values, each of which the source electrode is connected to a power supply voltage and the gate electrode is connected to a control signal input terminal, thereby functioning as excitatory, synapse NMOS transistors 101 each of which the drain electrode is connected to each drain electrode of synapse PMOS transistors 100, the source electrode is connected to a ground voltage and the gate electrode is connected to a control signal input terminal, thereby functioning as inhibitory, NAND gates 102 which receive an input signal IN and an enable signal EN and generate first control signals for controlling the respective gate electrodes of synapse PMOS transistors 100, AND gates 103 which receive input signal IN and enable signal EN and generate second control signals for controlling the respective gate electrodes of synapse NMOS transistors 101, a first up/down counter 104 which supplies the output signals thereof to input terminals of respective NAND gates 102 for increasing or decreasing the respective weight values of synapse PMOS transistors 100 and a second up/down counter 105 which supplies the output signals thereof to input terminals of respective AND gates 103 for increasing or decreasing the respective weight values of synapse NMOS transistors 101.

The error detector 2 comprises an AND gate 106 which receives input signal IN, the output signals A and B of error counter 70 and repetition number counter 30, and an error value C generated when the output signal $OUT_m$ of the synapse groups is not equal to the desired output signal $DEOUT_m$ by comparing the former with the latter. So as to be logically operated an AND gate 107 receives the desired output signal $DEOUT_m$ and the output signal of AND gate 106. So as to be logically operated an AND gate 109 receives the output signals of inverter 108 which inverts the desired output signal $DEOUT_m$ and AND gate 106. So as to be logically operated, a NOR gate 110 receives the most significant bit and the least significant bit of first up/down counter 104. So as to be logically operated, a NOR gate 112 receives the most significant bit and the least significant bit of second up/down counter 105. So as to be logically operated, an AND gate 114 receives the output signal of an inverter 111, for inverting the output of NOR gate 110, and the output signal of AND gate 109 to generate a signal for down-counting first up/down counter 104. An AND gate 115 receives the output signals of AND gate 107 and NOR gate 112 to generate a signal for up-counting first up/down counter 104. An AND gate 116 receives the output signals of AND gate 109 and NOR gate 110 to generate a signal for up-counting second up/down counter 105. An AND gate 117 receives the output signals of inverter 113 and AND gate 107 to generate a signal for down-counting second up/down counter 105.

Figure 3:
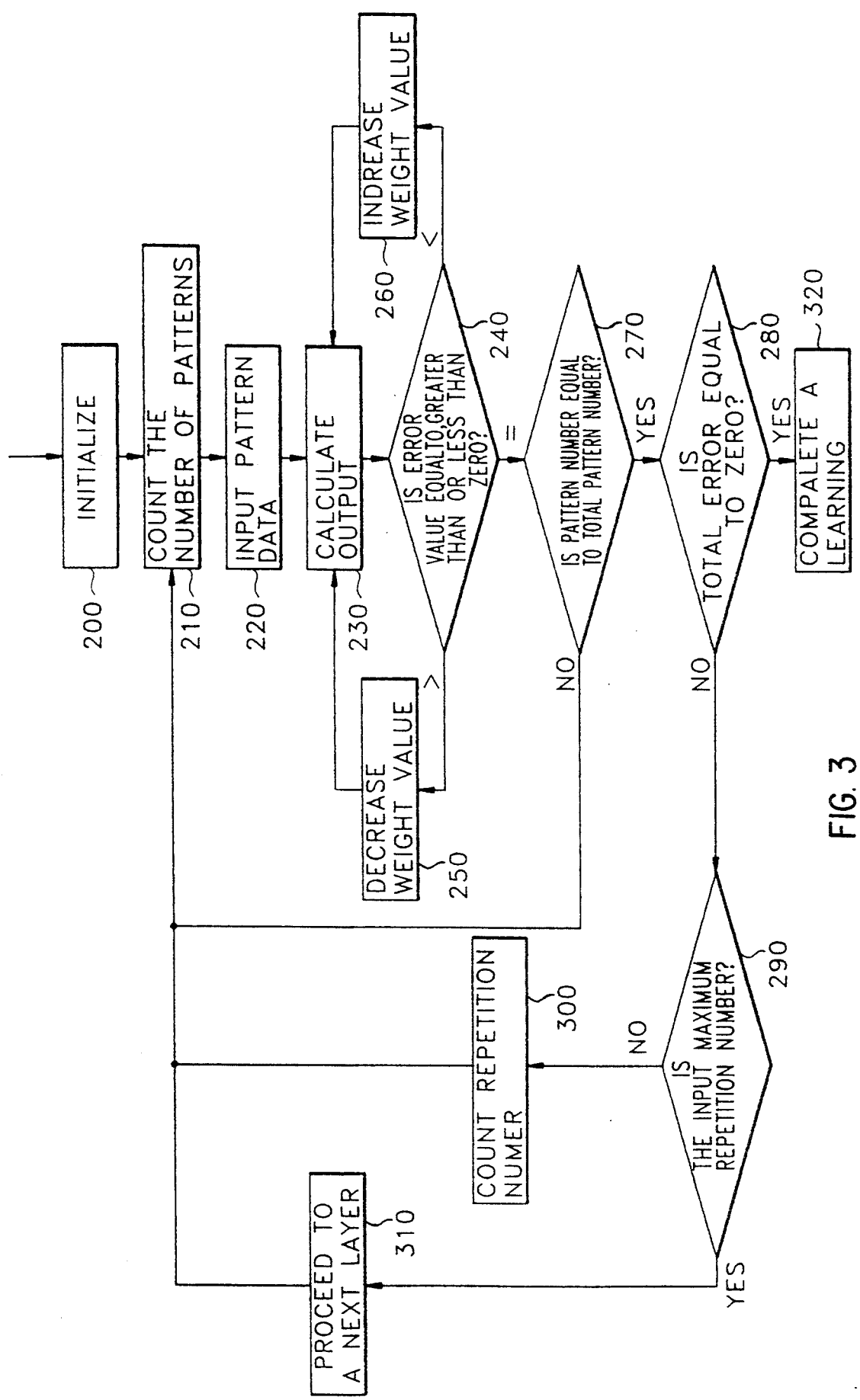
FIG. 3 is a flowchart for explaining an operation of the circuit shown in FIGS. 1 and 2.

FIG. 3 is a flowchart for explaining an operation of the circuit shown in FIGS. 1 and 2.

In step 200, the system is initialized. In this step, the weight values of the synapse are zero, the input patterns and the output patterns having the m pattern elements, and the input maximum repetition number are given.

In step 210, repetition number counter 30 counts the repetition number, and comparator 40 compares the input maximum repetition with the output signal of repetition number counter 30, to check if both are identical to each other. Then, if the output signal of comparator 40 represents that both compared signals are not same, pattern counter 50 counts the number of the patterns.

In step 220, the m pattern elements are read out from storage means 60 in sequence in response to the output signal of pattern counter 50, so as to be supplied to the multi-layer neural network.

In step 230, the first-layer neural network receives the output signal of the storage means to perform a learning.

In step 240, the error detector detects if the error value obtained by subtracting the output pattern value from the desired output pattern value equal to, greater than or less than zero.

When the error value is greater than zero in step 240, the learning is performed while the weight value of the first-layer neural network is decreased in step 250.

When the error value is less than zero in step 240, the learning is performed while the weight value of the first-layer neural network is increased in step 260.

When the error value is zero in step 240, it is judged that pattern counter 50 counts the total number of the patterns in step 270. If pattern counter 50 does not count the total number of the patterns in step 270, the system moves to step 210 to further count the number of the patterns.

When the total number of the patterns has been counted in step 270, it is judged if the total error is zero after all the patterns have been learned in step 280.

When the total error is not zero in step 280, it is judged if repetition number counter 30 counts the input maximum repetition number in step 290.

When the input maximum repetition number is not counted in step 290, the repetition number is further counted in step 300.

When the input maximum repetition number is counted in step 290, the system moves the learning from the first-layer neural network to the second neural network in steps 210 through 280, to repeat the steps 210 through 280.

When the error value is zero in step 280, the learning is completed in step 320.

The neural network according to the present invention can be applied to a technology of the recognition field such as character recognition, voice recognition.

The self-learning multi-layer neural network according to the present invention can perform self-learning in a chip if the user inputs only the input patterns, the output patterns and the repetition number, thereby constituting the neural network so as to perform a desired function.

What is claimed is:

1. A self-learning multi-layer neural network comprising:
   a first neural network means for receiving an N-bit input data corresponding to the respective bits of a desired M-bit output data to perform a first learning and includes synapse groups equal to the number of bits of said M-bit output data for outputting the result of the first learning;
   second through N-th neural network means, each for receiving said N-bit input data and output signals of a preceding neural network to perform a respective second through N-th learning and each second through N-th neural network means including as many synapse groups as the number of bits of said M-bit output data for outputting the result of the respective second through N-th learning;
   control means for supplying the input data to said first through N-th neural network means to repeat the first through N-th learning by a maximum repetition number;
   wherein each synapse of said synapse groups includes excitatory synapse PMOS transistor means for increasing the weight value, inhibitory synapse NMOS transistor means coupled to said excitatory synapse PMOS transistor means for decreasing the weight value and wherein each synapse has a predetermined number of different weight values; and
   a plurality of error detector means, one of said error dectector means associated with each of said synapse groups, each of said error detector means configured for receiving the output signals of its respective synapse group, for receiveing a desired output signal, for determining whether the received output signal of the respective synapse group equals the desired output signal, and for increasing or decreasing the weight value of its respective synapse group if the received output signal does not equal the desired output signal.

2. The self-learning multi-layer neural network according to claim 2, wherein the self-learning multi-layer neural network is contained on a single semiconductor chip.

3. The self-learning multi-layer neural network according to claim 2, wherein said control means comprises:
   a repetition number counter means for counting the number of repetitions and generating an output signal corresponding to the number of repetitions;
   a comparator means coupled to said repetition number counter means for determining whether the output signal of said repetition number counter means equals said maximum repetition number and generating a signal indicative of the determination;
   a pattern counter means coupled to said comparator means for counting patterns if the signal generated by said comparator means indicates that the output signal of said repetition number counter is not equal to said input maximum repetition number and for generating an output signal indicative of the next pattern to be input to the said neural network;
   storage means coupled to said pattern counter means for storing input patterns and for outputting the stored input patterns corresponding to the output signal of said pattern counter to the said neural network;
   an error counter means coupled to said neural network for counting errors when at least one among the synapse groups of said neural network which performs said learning generates an error signal; and
   a layer counter means coupled to said neural network for causing said neural network to proceed to a next layer to perform a learning when the output signal of said error counter is a signal that represents that an error is generated and the output signal of said repetition number counter is said input maximum repetition number.

4. A learning method in a self-learning multi-layer neural network including a first neural network layer which receives N-bit input data corresponding to the respective bits of desired M-bit output data to perform learning and has as many synapse groups as the number of bits of said M-bit output data for outputting the result of the learning; and second through Nth neural network layers which receive said N-bit input data and output signals of said first neural network to perform learning and which have as many synapse groups as the number of bits of said M-bit output data corresponding to the number of bits of said N-bit input data for outputting the result of the learning, wherein each synapse of said synapse groups comprises excitatory synapse MOS transistors for increasing weight and inhibitory synapse MOS transistors connected to said excitatory synapse MOS transistors for decreasing weight and wherein each said synapse has a predetermined number of different weight values, said learning method comprising the steps of:

(a) initializing said weight value of each said synapse;

(b) receiving said N-bit input data in said first neural network layer and desired M-bit output data corresponding to the input data in said first neural network layer;

(c) processing said N-bit input data according to the weight value of each said synapse in said first neural network layer to generate output data;

(d) comparing the output data with said desired output data, generating an error value if no match occurs and adjusting said weight value of each said synapse; and (e) unless a match occurs or steps (c) and (d) have been repeated a set maximum number of times, then proceeding to a next neural network layer and repeating steps (b) through (e) for that next layer.

* * * * *